(12) United States Patent
Yoo

(10) Patent No.: US 6,328,375 B2
(45) Date of Patent: Dec. 11, 2001

(54) CAB MOUNTING RUBBER

(75) Inventor: Jin-Sung Yoo, Ansan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/750,997

(22) Filed: Dec. 29, 2000

(30) Foreign Application Priority Data

Dec. 30, 1999 (KR) .................................................. 99-66501

(51) Int. Cl.$^7$ .................................................... B60J 7/00
(52) U.S. Cl. ..................................... 296/190.07; 296/35.1
(58) Field of Search ............................. 296/190.07, 35.1, 296/190.01; 180/89.13, 89.14; 267/141, 153

(56) References Cited

U.S. PATENT DOCUMENTS

| | | | |
|---|---|---|---|
| 4,372,411 | * | 2/1983 | Flower ................................ 180/89.15 |
| 4,451,079 | * | 5/1984 | Takahashi ...................... 180/89.13 X |
| 5,984,036 | * | 1/2000 | Higuchi et al. ............. 296/190.07 X |
| 6,017,073 | * | 1/2000 | Lindblom et al. .................. 296/35.1 |

* cited by examiner

*Primary Examiner*—Joseph D. Pape
(74) *Attorney, Agent, or Firm*—Christie, Parker & Hale, LLP

(57) ABSTRACT

A cab mounting rubber wherein a stopper is inhibited from being seceded to eliminate such problems as decreased cap durability, shortened life and tilted cab, and rubber comprising: a stopper mounted at the boss; and a flange mounted at a space formed at one side of the stopper in order to prevent detachment of the stopper.

4 Claims, 1 Drawing Sheet

CAB MOUNTING RUBBER

CROSS-REFERENCE TO RELATED APPLICATION

This application claims priority of Korea patent Application No. 99-66501, filed on Dec. 30, 1999.

BACKGROUND OF THE INVENTION

1. Field of the Invention

The present invention relates to a cab mounting rubber, and more particularly to a cab mounting rubber constructed to improve durability of cab and to prevent the cab from being tilted.

2. Description of the Prior Art

Generally, a cab mounting rubber, by way of example, a liquid-filled cab mounting rubber is mounted at between a frame and a connector of the cab to greatly decrease a road vibration while a vehicle is running, thereby improving ride ability and stillness thereof.

However, there is a problem in the liquid-filled cab mounting rubber according to the prior art in that a stopper 11 is detached to generated, by way of example, a gap of 8mm, thereby causing a severe vertical fluctuation of cab when the vehicle is running on a rugged road and head lamp housing interferes with gear box due to interference from gear box bracket and upper end of hinge bracket.

There is another problem in that the cab is tilted to create a bad exterior appearance when clearance is generated because of detachment of the stopper 11. There is still another problem in that when the cab is tilted, shearing force is created to slip the stopper 11.

There is still further problem in that a crack occurs between main sill and dash board to create a decreased cab durability. Possibility of detachment still remains when the stopper 11 is just glued.

SUMMARY OF THE INVENTION

The present invention is disclosed to solve the aforementioned problems and it is an object of the present invention to provide a cab mounting rubber adapted to improve durability, thereby preventing a stopper from being detached.

In accordance with the object of the present invention, there is provided a cab mounting rubber, the rubber comprising:

a boss;

a stopper mounted at the boss; and a flange mounted at a space formed at one side of the stopper in order to prevent detachment of the stopper.

The stopper is mounted with flanges, one each at left and right side thereof in the present invention.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION OF THE INVENTION

Now, preferred embodiment of the present invention will be described in detail with reference to the accompanying drawings.

Figure 1:
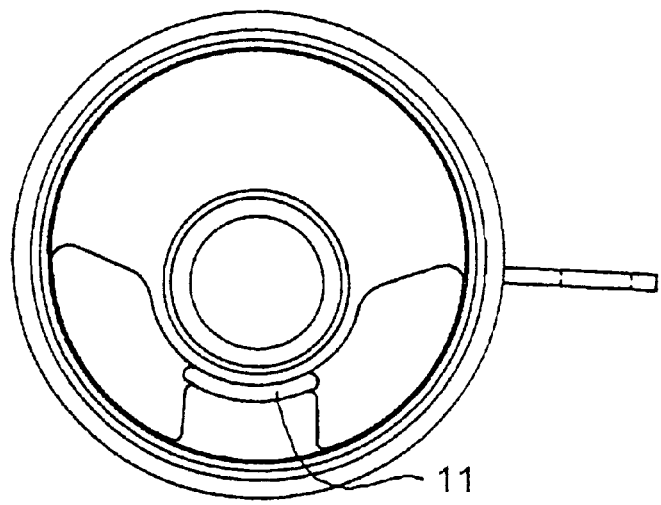
FIG. 1 is a schematic plane view for illustrating construction of a cab mounting rubber according to the prior art.
Figure 2:
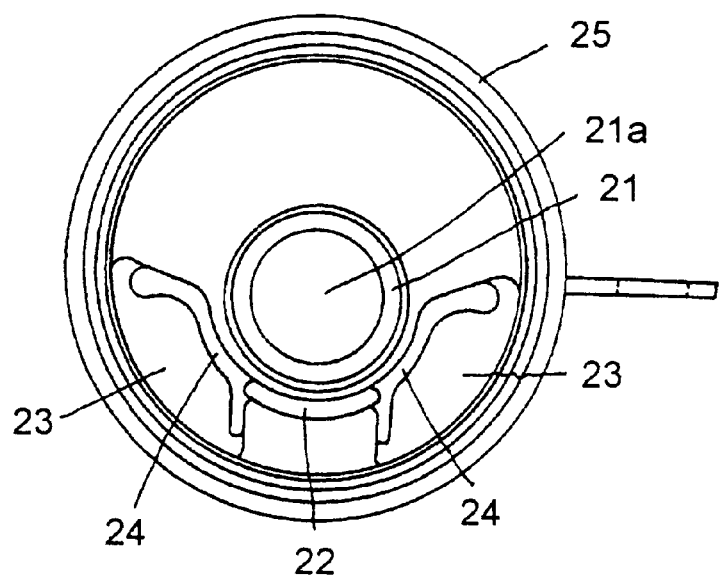
FIG. 2 is a schematic plane view for illustrating construction of a cab mounting rubber according to the present invention.

FIG. 2 is a schematic plane view for illustrating construction of a cab mounting rubber according to the present invention, where the cab mounting rubber includes a boss 21 mounted with a minor diameter 21a into which a bar is inserted, a stopper 22 formed at the boss 21 and a flange 24 formed at a space 23 provided at one side of the stopper 22 for preventing the stopper 22 from being detached. The stopper is mounted with flanges 24, one each at left and right side thereof.

Meanwhile, unexplained reference numeral 25 in FIG. 2 defines bracket where elements mentioned above are accommodated.

Now, operation of the cab mounting rubber thus constructed will be described. It should be appreciated that a general operation of a cab mounting rubber is omitted and only specific characteristics of operations found in the present invention will be explained.

Referring to FIG. 2, the stopper 22 is provided with flanges, each at left and right side thereof to thereby prevent the stopper 22 from being detached, such that no pushing phenomenon of stopper 22 occurs when a vehicle is tilted and a cab is prevented from being tilted due to weight deviation to the left.

Furthermore, interference of gear box bracket is avoided to thereby eliminate interference from head lamp and gear box.

As apparent from the foregoing, there is an advantage in the cab mounting rubber thus described according to the present invention in that a stopper is inhibited from being seceded to eliminate such problems as decreased cap durability, shortened life and tilted cab. There is another advantage in that a tilted bad exterior appearance is reduced for which a flange is simply installed without any big change of processes.

The invention is not restricted to the above examples. In practice many variations are possible to those skilled in the art without departing from the scope of this invention.

What is claimed is:

1. A cab mounting rubber comprising:

a boss;

a stopper mounted at the boss; and a flange mounted at a space formed at one side of the stopper for preventing detachment of the stopper.

2. The rubber as defined in claim 1, further comprising a second flange mounted at a space formed at another side of the stopper for preventing detachment of the stopper.

3. A cab mounting rubber comprising:

a boss;

a stopper mounted on the boss;

a flange on one side of the stopper for preventing seceding of the stopper.

4. The rubber as defined in claim 3 further comprising a second flange on another side of the stopper.

* * * * *